(12) United States Patent
Uetani

(10) Patent No.: US 11,273,517 B2
(45) Date of Patent: Mar. 15, 2022

(54) ROTARY FRICTION WELDING

(71) Applicant: ADOS Corporation, Kyoto (JP)

(72) Inventor: Koji Uetani, Kyoto (JP)

(73) Assignee: ADOS CORPORATION, Kyoto (JP)

( * ) Notice: Subject to any disclaimer, the term of this patent is extended or adjusted under 35 U.S.C. 154(b) by 187 days.

(21) Appl. No.: 16/642,501

(22) PCT Filed: Aug. 23, 2018

(86) PCT No.: PCT/JP2018/031848
§ 371 (c)(1),
(2) Date: Feb. 27, 2020

(87) PCT Pub. No.: WO2019/044862
PCT Pub. Date: Mar. 7, 2019

(65) Prior Publication Data
US 2020/0262001 A1    Aug. 20, 2020

(30) Foreign Application Priority Data

Aug. 31, 2017  (JP) .............................. JP2017-179523

(51) Int. Cl.
*B23K 20/12* (2006.01)
*E04B 1/24* (2006.01)
*B23K 103/04* (2006.01)

(52) U.S. Cl.
CPC ............ *B23K 20/12* (2013.01); *E04B 1/2403* (2013.01); *B23K 2103/04* (2018.08); *E04B 2001/2457* (2013.01)

(58) Field of Classification Search
None
See application file for complete search history.

(56) References Cited

U.S. PATENT DOCUMENTS 6,227,433 B1 * 5/2001 Waldron ................ B23K 20/12
                                                228/112.1
6,779,708 B2 * 8/2004 Slattery .............. B23K 20/1205
                                                228/112.1
(Continued)

FOREIGN PATENT DOCUMENTS

JP        52-075641 A    6/1977
JP        61-176484 A    8/1986
(Continued)

OTHER PUBLICATIONS

"International Search Report", PCT/JP2018/031848, dated Nov. 27, 2018, 1 page.

*Primary Examiner* — Devang R Patel
(74) *Attorney, Agent, or Firm* — Ogilvie Law Firm

(57) ABSTRACT

A void having a side peripheral surface and a bottom part is machined in a rotationally symmetrical shape spanning the end surface of a first steel member and the end surface of a second steel member; in a state in which a pressing force is applied to a contact area between the tip part of a joining metal and the bottom part of the void, the joining metal is rotated around a rotation axis and friction is created; the material structure around a rotational friction surface is joined using friction heat caused by the friction and molten metal is generated; a gap between a side peripheral surface of the joining metal and the side peripheral surface of the void is filled with the liquefied molten metal; and the first steel member and the second steel member are joined via the joining metal through integration with the structure near the gap.

20 Claims, 10 Drawing Sheets

(56) References Cited

U.S. PATENT DOCUMENTS

| | | | | |
|---|---|---|---|---|
| 7,832,970 B2* | 11/2010 | Wang | ............... | B21J 15/043 |
| | | | | 411/171 |
| 2003/0111514 A1* | 6/2003 | Miyanagi | ............... | B23K 20/12 |
| | | | | 228/112.1 |
| 2003/0201306 A1* | 10/2003 | McTernan | ............ | B23K 20/122 |
| | | | | 228/112.1 |
| 2010/0180533 A1 | 7/2010 | Spiegel et al. | | |
| 2017/0136686 A1 | 5/2017 | Ueno et al. | | |

FOREIGN PATENT DOCUMENTS

| | | | |
|---|---|---|---|
| JP | 2000-094157 A | 4/2000 |
| JP | 2000-301364 A | 10/2000 |
| JP | 2000-312981 A | 11/2000 |
| JP | 2010-167496 A | 8/2010 |
| JP | 2011-152563 A | 8/2011 |
| JP | 2015-182430 A | 10/2015 |

* cited by examiner (a)

(b)

ROTARY FRICTION WELDING

TECHNICAL FIELD

The present invention relates to a joining method and a joining structure of steel members by rotational friction. More specifically, it is related to a joining method and a joining structure of the steel members which include steel structure frames, such as a column and a beam used for architectural steel structure.

BACKGROUND ART

FIG. 17 shows an example of joining steel members by a conventional friction welding method. As shown in FIG. 17a, while pressing the first steel member 110 and the second steel member 120 being pressed (friction pressure), after melting or softening the material structure near the contact part 160 by the friction generated at the contact portion 160 between the first steel member 110 and the second steel member 120, even larger pressing force (upset pressure) is applied to integrate the first steel member 110 and the second steel member 120. In the case of the friction welding method, as shown in FIG. 17b, the structure in the vicinity of the contact portion 160 liquified by melting is discharged from the friction surface by the friction pressure and the upset pressure to form a majority of burr 181, which is not effectively utilized in a usual case. Meanwhile, the softened solid structure remains in the vicinity of the friction surface to contribute to solid joining of the steel members.

In Patent Document 1, a friction welding method and a joining structure are presented wherein a contact portion is manufactured so that the tips of a stainless-steel round bar and a brass round bar are in contact with each other, and the material structure in the vicinity of the contact portion is melted or softened by friction generated by relatively rotating the contact portion while the contact portion is pressed to each other to be integrated. In Patent Document 2, it is presented that a ring member having the same diameter as that of two pipes is clamped between the two pipes which are in contact with each other, to form a contact portion between the ring member and the pipes, and the pipes on both sides are pressed against the ring member. While the ring member is rotated, the material structure in the vicinity of the contact portion is melted or softened by friction, and finally the pipes on both sides and the ring member are joined together. This is presented as a friction welding method with a joining structure being a so-called insert method. In Patent Document 3, it is presented that a bonding auxiliary member having the same cross-sectional shape as that of a reinforcing bar is placed between two reinforcing bars in an interjecting manner so as to be in contact with each other, and the material structure is melted or softened by friction generated by rotating the bonding auxiliary member while the reinforcing bars on both ends are pressed to be integrated. This is presented as a friction welding method with a joining structure. In Patent Document 4, a method is presented for inserting into a void a rod-shaped insert having a slightly larger diameter than the void. A rotational motion and a large force in the insert direction are applied and the vicinity of the void inlet and further the inside of the void are softened or melted and the insert is gradually inserted.

A prior application by the applicants provides the technique shown in FIG. 18. The first steel member 210 and the second steel member 220 are disposed adjacent to each other, the end surface 211 of the first steel member 210 and the end surface 221 of the second steel member 220 are disposed to face each other, and the void 250 in a rotationally symmetrical shape lying across the end surface 211 of the first steel member 210 and the end surface 221 of the second steel member 220 is manufactured. Meanwhile, a joining metal 240 having a rotationally symmetric body shape that is substantially the same shape as that of the rotationally symmetric void 250 is manufactured and loosely fitted in the void 250. At this time, the contact surface 260 between the first steel member 210 and the second steel member 220 and the bonding metal 240 includes the side peripheral surface 252 of the void 250 and the side peripheral surface 242 of the bonding metal 240. The bonding metal 240 is rotated around the rotational axis 271 of the rotationally symmetric body while pressing the bonding metal 240 toward the contact surface 260, and the material structure in the vicinity of the contact surface 260 is melted or softened using the frictional force generated on the contact surface 260 to be integrated. In this way, the first steel member 210 and the second steel member 220 are joined via the joining metal 240.

PRIOR ART

Patent Literature

[Patent literature 1] JP 2000-301364 A
[Patent literature 2] JP 2000-094157 A
[Patent literature 3] JP 2011-152563 A
[Patent literature 4] JP 1977 075641 A Outline of the Invention Problems to be Solved by the Invention The conventional friction welding method has been put to practical use for joining relatively small-scale steel members such as reinforcing bars. However, in the case of the long reinforcing bar disclosed in Patent Document 3, a large-scale facility is required for the rotation of the bar. In the method of Patent Document 4, a lot of burrs that do not contribute to the joining are generated in the vicinity of the void entrance, which obstructs the insertion. Therefore, a great force is required to overcome the obstruction. Furthermore, if these methods are applied to the joining of large-scale steel members such as columns and beams of architectural steel structures, the performance of the pressurization mechanism and power mechanism required for applying pressure and friction becomes enormous. Therefore, it is difficult to apply to the on-site joining of construction steel structures at construction sites. At present, the joining of steel members constituting a steel structural framework such as columns and beams of architectural steel structures is mostly performed by either welding or high-strength bolt friction welding. However, in the case of high-strength bolt friction welding, there are drawbacks such as a cross-sectional defect of the steel member to be joined by the bolt hole and difficulty in tightening from only one side of the bolt hole. Furthermore, in the case of welding there is a drawback that defects can occur depending on the environment of the construction site and the skill of the technician, and the provision of a new joining method capable of solving these problems is desired. On the other hand, in the prior invention by the present applicant, some of the above problems are solved, and a joining method and joining structure by the local rotational friction method that can be applied to joining large-scale steel members with a relatively small mechanism, preferably a portable size tool was presented. However, since it is necessary to rotate and simultaneously press the contact portion in this method, the mechanism may become complicated and expensive.

An object of the present invention is to realize the joining of steel members by a pressing force smaller than that of the conventional invention and rotation of joining metal.

Means to Solve the Objects

In the invention of claim 1, a joining method for joining the first steel member and the second steel member through joining metal based on rotational friction is included; said first steel member and said second steel member being positioned at neighboring positions; an end surface of said first steel member and an end surface of said second steel member being positioned opposing to each other; a manufactured void straddling an end surface of said first steel member and an end surface of said second steel member and having a straight line perpendicular to or quasi perpendicular to a surface of said first steel member and said second steel member as a rotational axis and having a side peripheral surface and a bottom in a rotationally symmetrical shape; said joining metal being a rotationally symmetrical body easily insertable into said void; said joining metal being inserted into said void; friction being generated by rotating said joining metal around a rotating axis with a contact portion between a tip of said joining metal and said bottom of said void under pressing force; molten metal being generated by melting material structure near said contact portion by utilizing frictional heat from said friction; said liquefied molten metal being filled into a gap between said peripheral surface of said joining metal and said peripheral surface of said void by utilizing pressing force and rotational motion generated at the tip of said joining metal; subsequently, rotational movement being stopped to have said molten metal be solidified and be integrated with structure near said gap, thus joining said first steel member and said second steel member.

Here, as to the quality of materials of the first steel member and the second steel member, each is an arbitrary structural steel member, and the quality of material of the joining metal can be any type of metal as long as it is melted by friction and is able to integrate the first steel member and the joining metal, and the second steel member and the joining metal. For example, steel members, alloy steel members, aluminum materials, aluminum alloy materials, and the like can be used. The shape of the void and the shape of the bonding metal are rotationally symmetric shapes that are easy to rotate while pressing the bonding metal against the void. A rotationally symmetric shape generating line is an arbitrary monotonically changing curve. Here, the "side circumferential surface" means a surface generated by a generatrix in a rotationally symmetric body. The phrase "can be easily inserted into a void" means that the insertion is easy with a moderate gap between the side peripheral surface of the joining metal and the side peripheral surface of the void.

In the invention of claim 2, a joining method for joining the first steel member and the second steel member through joining metal based on rotational friction is included; said first steel member and said second steel member being positioned at neighboring position; a back surface of said first steel member and a front surface of said second steel member being positioned opposite to each other; a void having a side peripheral surface and a bottom in a rotationally symmetrical shape with a straight line running through a back surface of said first steel member and a front surface of said second steel member as a rotational axis being manufactured; said joining metal being inserted into said void; friction being generated by rotating said joining metal around a rotating axis with a contact portion between a tip of said joining metal and said bottom of said void under pressing force; molten metal being generated by melting material structure near said contact portion by utilizing frictional heat by said friction; said liquefied molten metal being filled into a gap between said peripheral surface of said joining metal and said peripheral surface of said void by utilizing pressing force and rotational motion generated at the tip of said joining metal; subsequently, rotational movement being stopped to have said molten metal solidified and be integrated with structure near said gap, thus joining said first steel member and said second steel member.

In the invention of claim 3, said bottom of said void is formed inside the first steel member and/or the second steel member. Here, as an example of machining a bottomed void, there is a method of stopping the rotation of the drill before the drill blade that cuts the void penetrates the steel member.

In the invention of claim 4, said bottom of said void is formed by attaching a backplate at the back surface of a steel member in a manner to shut said void. Here, "attaching" means fixing the backing plate by spot welding or the like.

In the invention of claim 5, after completing the first joining by inserting and rotating said joining metal into said void; a second void is formed in a manner to continue or overlap said first joining metal; the second joining is completed by inserting and rotating the second metal into said second void; by thereafter repeating this procedure N times in order, said first steel member and said second steel member are joined.

In the invention of claim 6, an end surface of said first steel member and an end surface of said second steel member are disposed in opposition to each other; at an occasion wherein a void straddling an end surface of said first steel member and an end surface of said second steel member is manufactured, said void is made in such a manner that said rotational axis of said void exists inside said end surface, and is directed to a thickness direction of a steel member cross section, which is a short side direction of said end surface. According to the claim 6 invention, there is no need to increase the depth of the void.

In the invention of claim 7, an end surface of said first steel member and an end surface of said second steel member are disposed in opposition to each other; a void straddling an end surface of said first steel member and an end surface of said second steel member is manufactured; said void being manufactured in such a manner that said rotation axis of said void exists inside said end surface, and is directed to a width direction, which is a long side direction of said end surface. According to the claim 7 invention, it is possible to set the cutting position of the void a small number of times.

In the invention of claim 8, said void has a cylindrical shape and said joining metal has a roughly cylindrical body, as a combination of said joining metal and said void.

In the invention of claim 9, a volume of said joining metal is not smaller than that of said void. Namely, the claim 9 invention has a necessary condition of completely filling said gap with said molten metal.

In the invention of claim 10, said joining metal has a taper portion at the end portion of said joining metal. The generation of molten metal is promoted by reducing the area of the contact portion between the tip end portion of the joining metal and the bottom portion of the void and suppressing the motor torque at the start of rotation.

In the invention of claim 11, said side peripheral surface of said joining metal has unevenness. According to the claim 11 invention, in addition to the fact that the generated molten metal easily fills and penetrates in the depth direction of the void, the bonding strength is increased by increasing the contact area of the side surface of the molten metal and the bonding metal.

In the invention of claim 12, said unevenness on said side peripheral surface of said joining metal is a ridge and a side of a cross sectional polygon of said joining metal. According to the claim 12 invention, it becomes easy for the generated molten metal to infiltrate the void in the depth direction.

In the invention of claim 13, said unevenness on said peripheral surface of said joining metal is a cross direction screw running toward a tip end from a base end of said joining metal. According to the claim 13 invention, the generated molten metal is prevented from being discharged from the void before the gap between the side peripheral surface of the joining metal and the side peripheral surface of the void is sufficiently filled, and promotes a solid filing of the molten metal in the gap.

In the invention of claim 14, an end portion of said joining metal has a flange covering a surface side of said void. According to the claim 14 invention, there is an effect of suppressing discharge of molten metal from the inside of the void.

In the invention of claim 15, a rotation number is set at 1000 to 12000 rpm at a time of insertion and after the insertion of said joining metal into said void. The rotational speed depends on the diameter of the joining metal and the void, and under conditions where the diameter is large and the gap between the joining metal and the void is large, it is necessary to increase the generation rate of the molten metal and high rotation speed can be effective in such a case.

In the invention of claim 16, a tensile strength of said joining metal is higher than both a tensile strength of said first steel material and a tensile strength of said second steel material. According to the claim 16 invention, the bonding strength is increased.

In the invention of claim 17, a liquidus temperature of said joining metal is lower than either a liquidus temperature of said first steel material and said second steel material. According to the claim 17 invention, the effect of filling the gap between the joining metal and the void is enhanced by making the molten metal generation easier. Here, the "liquidus temperature" refers to the melting point of a pure metal. In the case of a multi-component alloy, the solidification start temperature (i.e. the liquefaction completion temperature) and the liquefaction start temperature (i.e. the solidification completion temperature) are different. Therefore, the solidification starting temperature is not called the melting point, but is called the liquidus temperature.

In the invention of claim 18, a high strength Al alloy (A2017, 2024, 7075 and such) is employed as a metal of low liquidus temperature for said joining metal.

In the invention of claim 19, a joining structure of steel member by rotational friction includes said first steel member and said second steel member joined by a method of any one of claims 1 to 18. Being a steel structure joined using the rotational friction welding method provided by the present invention, it can be applied as a joining structure of steel including not only architectural steel structures, but also all the civil engineering steel structures, mechanical steel structures, container steel structures, steel structures for living equipment etc.

Effects of the Invention

A joining method and a joining structure by friction are provided for joining steel members that constitute a steel structure skeleton such as columns and beams of building steel structures, using a relatively small mechanism, preferably a tool having a portable size, which can be used for joining large-scale steel members by rotational friction. In particular, the present invention provides a method for realizing joining by rotational friction using a simple mechanism that only requires rotation without requiring a large pressing force.

Since the joining is completed by solidifying the metal and unifying the nearby structures, the following effects are produced and become technically useful.
(1) The torque and power of the motor that gives rotation can be greatly reduced. Namely, energy efficiency is increased. According to the present invention, the molten metal is generated by the friction at the contact portion between the tip portion of the joining metal and the bottom of the void, then melting and filling the void between the joining metal and the void.
(2) The device can be miniaturized and operability can be improved.
(3) Since the shape of the joining metal and the void is also established in a "cylindrical" shape, manufacturing becomes easier. The mass production and cost benefits brought about by this are extremely important for practical use.

The joining metal is inserted into the void, and the joining metal is simultaneously rotated around the rotation axis while applying a pressing force. Friction occurs at a contact portion between the tip of the joining metal and the bottom of the void, and the frictional heat causes a part of the metal structure near the friction surface to melt. The molten fluid, namely, the molten metal is extruded by the action of the pressing, and enters the gap between the side peripheral surface of the joining metal and the side peripheral surface of the void. Since the side peripheral surface of the joining metal and the side peripheral surface of the void have a relative speed due to the rotation of the joining metal, the molten metal having viscous resistance is constantly stirred, and the high temperature liquid state can be preserved by receiving thermal energy converted from mechanical energy and it is possible to continue to permeate into the gap between the joining metal and the void without solidifying immediately. The molten metal that has entered the gap is solidified due to a decrease in temperature due to heat removal from the periphery of the void when the rotation is stopped, causing the molten metal to function as a welding metal, and the joining metal and the periphery of the void become an integrated structure.

Note that in the above method, the molten metal generated at the interface of the contact portion of the joining member is not discharged as unnecessary solidified burrs as in the conventional friction welding method, but is used as welding metal for joining the steel member to be joined and the joining metal, which is a new technology. Since molten metal is a fluid, it can be easily penetrated into voids merely by virtue of viscous resistance which is much smaller than that of a solid. Further, since the friction is generated only at the contact portion between the frontend portion of the joining metal and the bottom of the void, both the pressing force applied to the joining metal and the torque of the motor for applying rotation can be small. Namely, joining by rotational friction using a simple mechanism becomes possible.

BEST MODE FOR CARRYING OUT THE INVENTION

Figure 1:
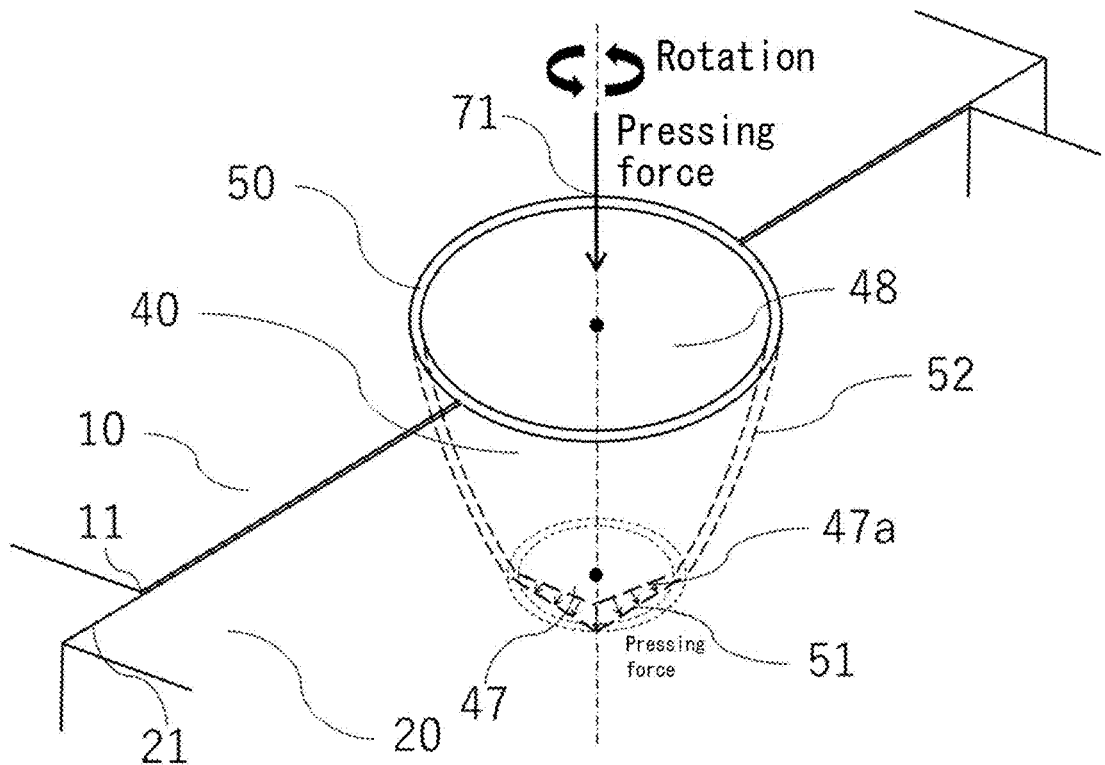
FIG. 1 is an isometric view illustrating Embodiment 1.

The Embodiments of the present invention will be described with reference to the drawings. The same components are denoted by the same reference numerals, and description thereof will be omitted or simplified.

Figure 2:
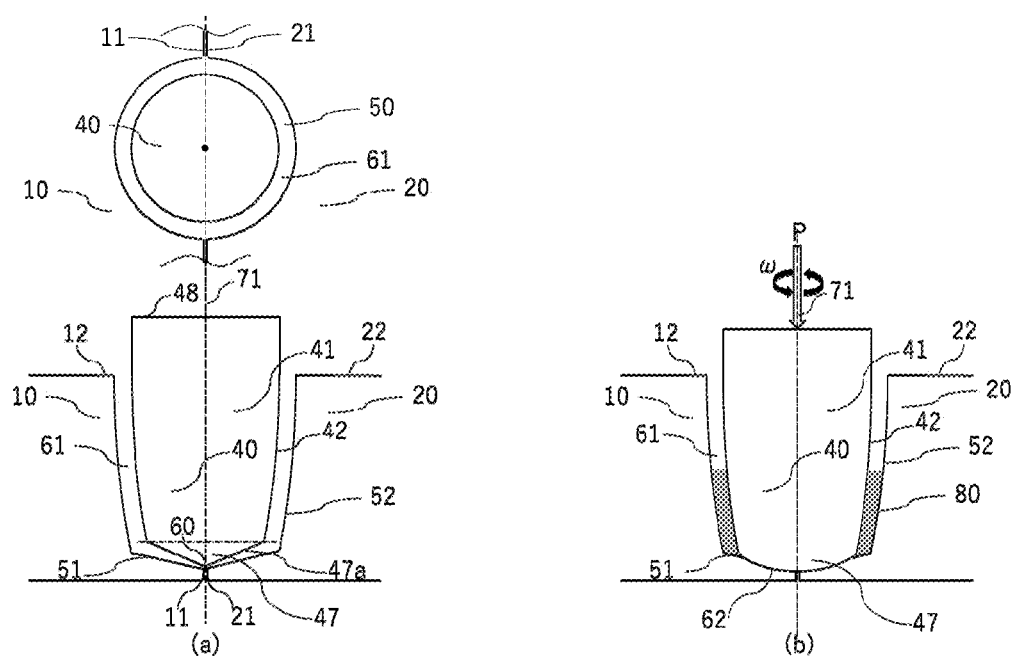
FIGS. 2A and 2B are a plan view and a vertical sectional view illustrating Embodiment 1.

Embodiment 1 of the present invention will be described with reference to FIG. 1 and FIG. 2. A first steel member 10 and a second steel member 20 are steel members having end surfaces. Examples of a steel member having an end surface include a steel plate, a flange and a web forming an H-section steel, a tubular steel plate body of a closed section member such as a square steel pipe and a circular steel pipe, and the like. The joint in which the end surfaces are arranged to face each other is specifically a butt joint. The first steel member 10 and the second steel member 20 are arranged adjacent to each other, and the end surface 11 of the first steel member 10 and the end surface 21 of the second steel member 20 are arranged to face each other. At this time, it is desirable that the end surface 11 of the first steel member 10 and the end surface 21 of the second steel member 20 are arranged in a surface contact (metal touch) state, but a slight displacement due to an unavoidable construction error or the like is acceptable. A void 50 is formed in a straight line that extends across the end surface 11 of the first steel member 10 and the end surface 21 of the second steel member 20. A side peripheral surface 52 in a rotationally symmetric shape having a monotonically changing curve as a generatrix with a straight line perpendicular to the surface 12 of the first steel member 10 and the surface 22 of the second steel member 20 and a conical bottom surface 51 continuous with the side peripheral surface 52 are made. Meanwhile, the joining metal 40 includes a joining metal main body 41 having a rotationally symmetrical side peripheral surface 42 whose generatrix is a monotonically changing curve, and a tip portion 47 having a conical tip end surface 47a continuous with the joining metal main body 41 with a size that can be easily inserted into the empty void 50. In this Embodiment, no unevenness is provided on the side peripheral surface 42 of the joining metal 40. The joining metal 40 is inserted into the void 50 so that the rotation axis 71 is aligned. Then, as shown in FIG. 2b, a rotation ω is applied around the rotation axis 71 while applying a pressing force P to the joining metal 40, thereby causing friction at the rotational friction surface 62 between the tip of the joining metal 40 and the bottom 51 of the void 50. The molten metal 80 melted/liquefied by the frictional heat is filled into the gap 61 between the side peripheral surface 42 of the joining metal 40 and the side peripheral surface 52 of the void 50 by utilizing the pressing force P and the rotational movement. When the molten metal 80 fills in the entire area of the gap 61, the rotation is stopped. With the subsequent temperature decrease, the molten metal 80 solidifies, and is integrated with the structure near the gap 61 to complete the joining. Then, as shown in FIG. 2b, a rotation ω is applied around the rotation axis 71 while applying a pressing force P to the joining metal 40, thereby causing friction at the rotational friction surface 62 between the tip of the joining metal 40 and the bottom 51 of the void 50. The friction is generated at the friction surface 62. The molten metal 80 liquefied by the frictional heat is filled into the gap 61 between the side peripheral surface 42 of the joining metal 40 and the side peripheral surface 52 of the void 50 by utilizing the pressing force and the rotational movement by the pressing force P, and when the molten metal 80 has filled in the entire area of the gap 61, the rotation is stopped. With the subsequent temperature decrease, the molten metal 80 solidifies, and is integrated with the structure near the gap 61 to complete the joining.

Figure 3:
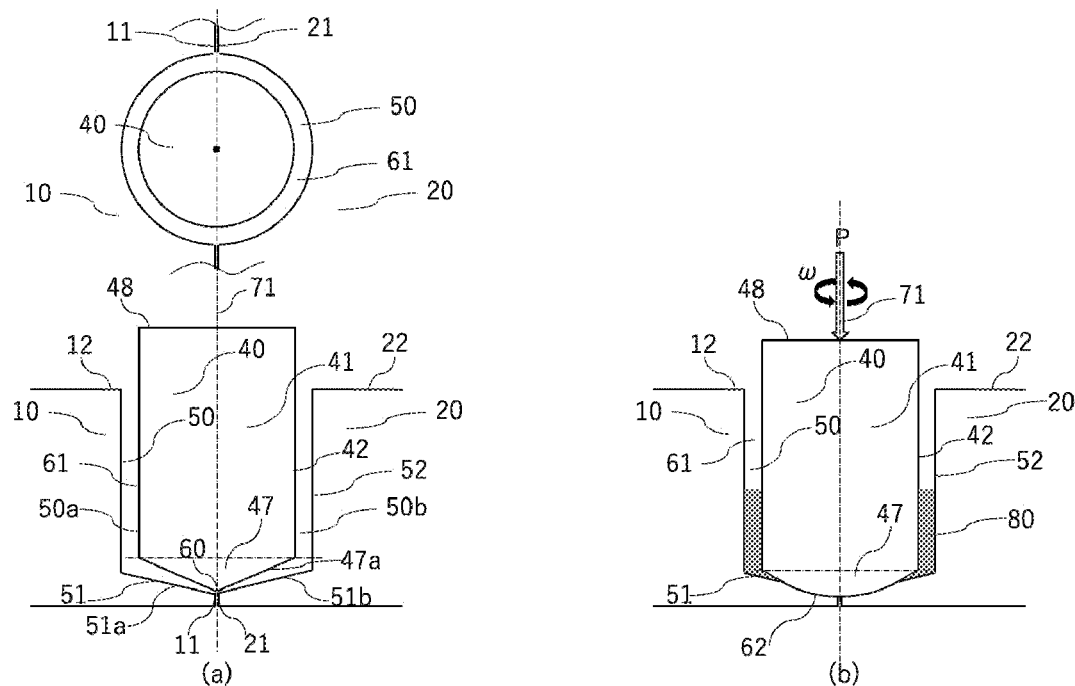
FIGS. 3A and 3B are a plan view and a vertical sectional view illustrating Embodiment 1.

Embodiment 2 of the present invention will be described with reference to FIG. 3. This embodiment is a butt joint similar to Embodiment 1, but will be described in detail with specific dimensions and materials. Each of the first steel member 10 and the second steel member 20 is respectively a steel plate having a SN 400 of a thickness of 22 mm. A semi-cylindrical void 50a having a radius of 15 mm is machined in the end surface 11 of the first steel member 10, and a semi-cylindrical void 50b having a radius of 15 mm is machined in the end surface 21 of the second steel member 20. The semi-cylindrical void 50a and the semi-cylindrical void 50b are bottomed voids having a cone-shaped bottom 51a and a bottom 51b each having an opening angle of 122° at the apex. The depth of the deepest portion of the void 50a and the void 50b is 17 mm, respectively. When the first steel member 10 and the second steel member 20 are arranged adjacent to each other and the end surface 11 of the first steel member 10 and the end surface 21 of the second steel member 20 are arranged to face each other, a cylindrical side peripheral surface 52 having a diameter 30 mm and a depth of 17 mm and a bottom 51 is formed over the end surface 11 of the first steel member 10 and the end surface 21 of the second steel member. At this time, it is desirable that the end surface 11 of the first steel member 10 and the end surface 21 of the second steel member 20 are arranged in a surface contact (metal touch) state, but a slight displacement due to an unavoidable construction error or the like is acceptable. Meanwhile, the joining metal 40 is composed of a cylindrical joining metal body 41 having a diameter of 29.5 mm, which is a SN400 steel member, and a tip portion 47. The tip portion 47 has a cone-shaped tip surface 47a having an opening angle at the vertex of 120°. In this Embodiment, no unevenness is provided on the side peripheral surface 42 of the joining metal 40. The joining metal 40 mounted on the rotating device 70 is inserted into the void 50. Next, as shown in FIG. 3b, a rotation co is applied around the rotation axis 71 while applying a pressing force P to the joining metal 40, thereby rotating the tip 47 of the joining metal 40 at the bottom 51 of the void 50, generating the friction at the friction surface 62. The rotation speed is 3000 rpm and the pressing force is 7000 N. The molten metal 80 liquefied by the frictional heat is filled into the gap 61 between the side peripheral surface 42 of the joining metal 40 and the side peripheral surface 52 of the cavity 50 by utilizing the pressing force and the rotational movement by the pressing force P, and when the gap 61 is filled entirely with the molten metal, the rotation is stopped. With the subsequent temperature decrease, the molten metal 80 solidifies, and is integrated with the structure near the gap 61 to complete the joining. By the way, in the present Embodiment, the bottom 51 of the cavity and the tip 47 of the joining metal 40 are each formed in a cone shape, but may also be formed in a flat surface shape.

Figure 4:
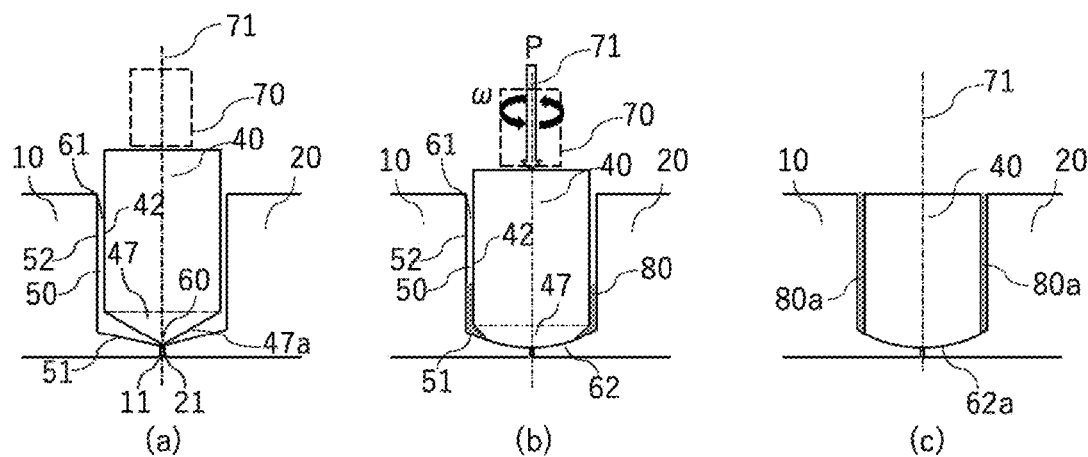
FIG. 4 is a diagram for explaining an implementation procedure of Embodiment 2.

FIG. 4 shows a stepwise execution procedure of a method of joining steel members in Embodiment 2.

(Procedure 1) FIG. 4a shows a state wherein a contact portion 60 is formed between a tip end portion 47 of the joining metal 40 and a bottom portion 51 of the cavity 50 by inserting a cylindrical joining metal 40 mounted on a rotating device 70 into a cylindrical void 50 that straddles the abutting surfaces of the first steel member 10 and the second steel member 20 which are arranged at adjacent positions.

(Procedure 2) FIG. 4b shows a state during joining. The pressing force P is applied to the joining metal 40, and the joining metal 40 is rotated around the rotation axis 71 at a rotation speed co while the pressing force P is kept constant, so that a friction is generated at the rotational friction surface 62 between the distal end portion 47 of the joining metal 40 and the bottom surface 51 of the void 50. The molten metal 80 liquefied by the frictional heat is pushed out by the action of the pressing force P and enters the gap 61 between the side peripheral surface 42 of the joining metal 40 and the side peripheral surface 52 of the cavity 50.

(Procedure 3) FIG. 4c shows a state after the joining. The molten metal 80 (refer to FIG. 4a) generated by the friction on the rotational friction surface 62 (refer to FIG. 4b) between the frontend portion 47 of the joining metal 40 and the bottom 51 of the cavity 50 forms a side peripheral surface of the joining metal 40. When the entire void of the gap 61 between the inner peripheral surface 42 and the side peripheral surface 52 of the void 50 is filled, the rotational movement of the joining metal 40 is stopped, and the molten metal 80a remaining in the gap and solidified with the subsequent temperature decrease is integrated with the nearby structure to complete the joining. In addition, 62a in FIG. 4c represents the rotational friction surface between the frontend portion 47 of the joining metal and the bottom portion 51 of the empty void when the joining is completed.

Note that the method of applying the pressing force P in the direction of the rotation axis 71 and the method of applying the rotation about the rotation axis 71 are arbitrary.

Figure 5:
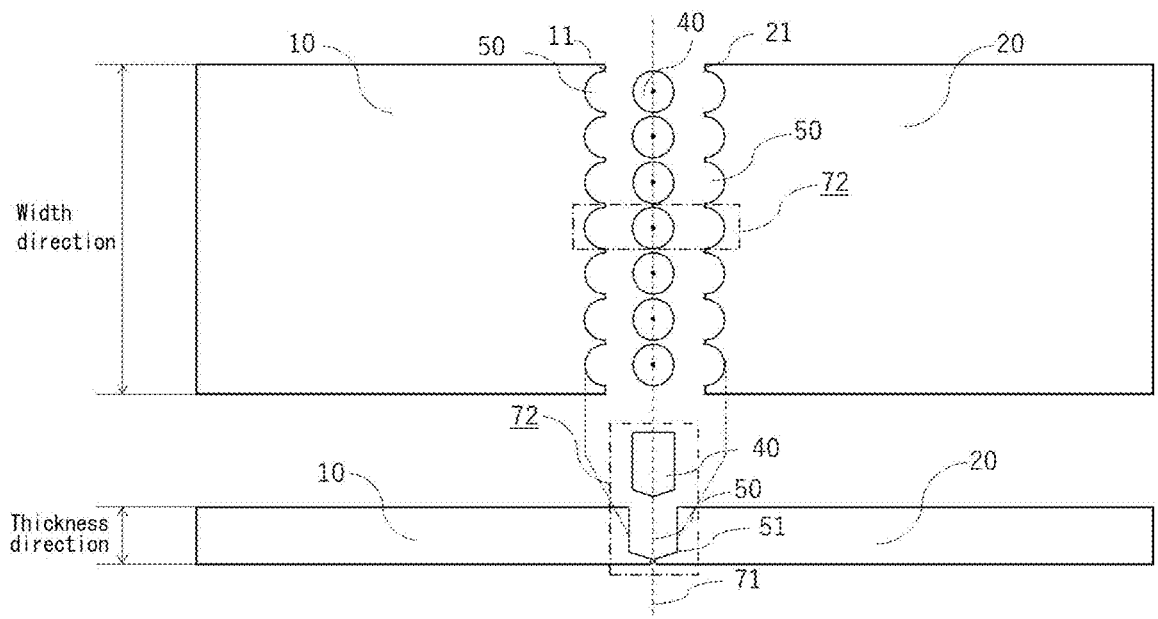
FIG. 5 is a diagram illustrating a joining unit.

The joining of the joint 50 and the joint metal 40 in Embodiment 2 of the present invention is performed by arranging the joint 50 and the joint metal 40 using a plurality of joint units 72 as shown in FIG. 5 at appropriate intervals along the boundary between the end surface 11 of the steel member 10 and the end surface 21 of the steel member 20. The necessary joining strength is ensured by arranging the plurality of joining units 72 in parallel. When machining such a void 50 that straddles the end surface 11 of the steel member 10 and the end surface 21 of the second steel member 20, the rotation axis 71 of the void 50 has the end surfaces 11 and 21 as shown in FIG. 5. The cavity 50 is machined so as to face the thickness direction of the cross section of the steel member, which is the short side direction of the end surfaces 11 and 21.

Figure 6:
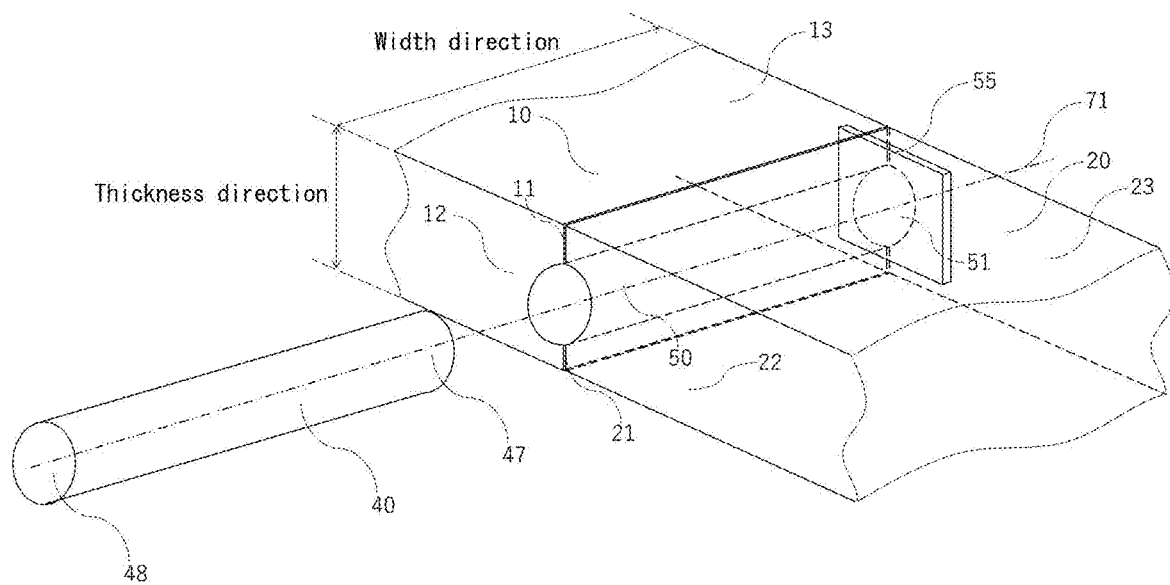
FIG. 6 is an isometric view illustrating a modification of Embodiment 2.

When machining the void 50 straddling the end surface 11 of the first steel member 10 and the end surface 21 of the second steel member 20 according to Embodiment 2 of the present invention, as shown in FIG. 6, the cavity 50 may be machined so that the rotation axis 71 has the end surfaces 11 and 21 and faces the width direction of the steel member cross section that is the long side direction of the end surfaces 11 and 21.

Figure 7:
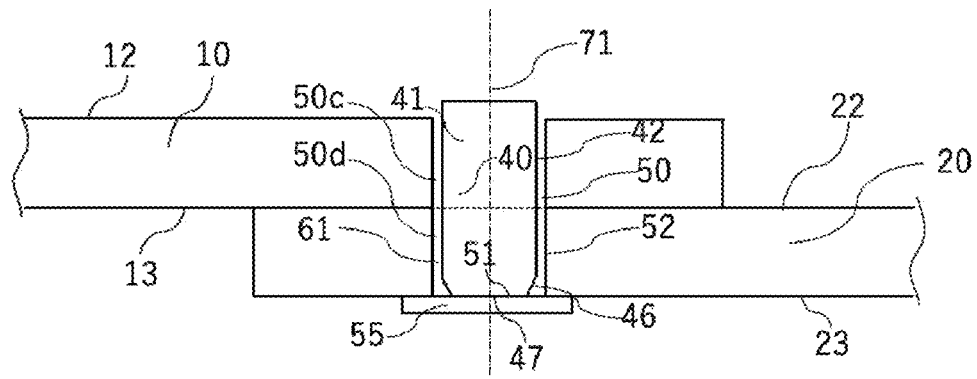
FIG. 7 is a plan view and a vertical sectional view illustrating Embodiment 3.

Embodiment 3 of the present invention will be described with reference to FIG. 7. The first steel member 10 and the second steel member 20 are steel members having a front surface and a back surface. Examples of a steel member having a front surface and a back surface include a steel plate for joining such as a steel plate and a splice plate, and a flange and a web constituting an H-section steel. The bonding in which the back surface and the front surface are arranged to face each other is, specifically, overlap bonding.

In the present Embodiment, the first steel member 10 and the second steel member 20 are each a steel plate having a SN thickness of 22 mm, and the first steel member 10 has a cylindrical void 50c having a diameter of 30 mm penetrating from the front surface 12 to the back surface 13 machined therein, a machined cylindrical void 50d having a diameter of 30 mm penetrating from the front surface 22 to the back surface 23. The first steel member 10 and the second steel member 20 are arranged in a superposed position. At the same time, the back surface 13 of the first steel member 10 and the front surface 22 of the second steel member 20 are opposed to each other. Further, the center of the cylindrical void 50c formed in the first steel member 10 and the center of the cylindrical void 50d are arranged so as to coincide with the rotation axis 71. A machined rotationally symmetric void 50 has the rotation axis 71 as a straight line passing through the first steel member 10 and the second steel member 20. Further, a backing plate 55 is attached to the back surface 23 of the second steel member 20 so as to cover the void 50, thereby forming the bottom 51 of the void 50. At this time, it is desirable that the back surface 13 of the first steel member 10 and the front surface 22 of the second steel member 20 are arranged in a surface contact (metal touch) state, but a slight deviation due to an unavoidable construction error or the like is acceptable. Meanwhile, the joining metal 40 is a SN400 steel member, the joining metal main body 41 is a cylindrical body having a diameter of 29.5 mm, and a tip portion 47 is provided with a taper portion 46 having a tip diameter of 29 mm and an inclination angle of 60°. In this Embodiment, no unevenness is provided on the side peripheral surface 42 of the joining metal 40. The joining metal 40 is inserted into the void 50, and is rotated about the rotational symmetry axis 71 while applying a pressing force to the joining metal 40 to generate friction. Here, the rotation speed is 3000 rpm and the pressing force is 7000 N. The molten metal 80 generated by the frictional heat fills in the gap 61 between the side peripheral surface 42 of the joining metal 40 and the side peripheral surface 52 of the cavity 50 by utilizing the pressing force and the rotational movement generated at the tip end portion 47. When the entire area of the gap 61 is filled, the rotation is stopped. As the temperature decreases thereafter, the molten metal 80 solidifies and the structure is integrated, and the first steel member 10 and the second steel member 20 are bonded via the bonding metal 40. By the way, in the present Embodiment, the cavity 50 and the joining metal 40 are to have columnar forms and cylindrical objects, respectively. However, as in Embodiment 1, those may possess the rotationally symmetric side peripheral surfaces 52 and 42 having a monotonically changing curve as a generating line.

Figure 8:
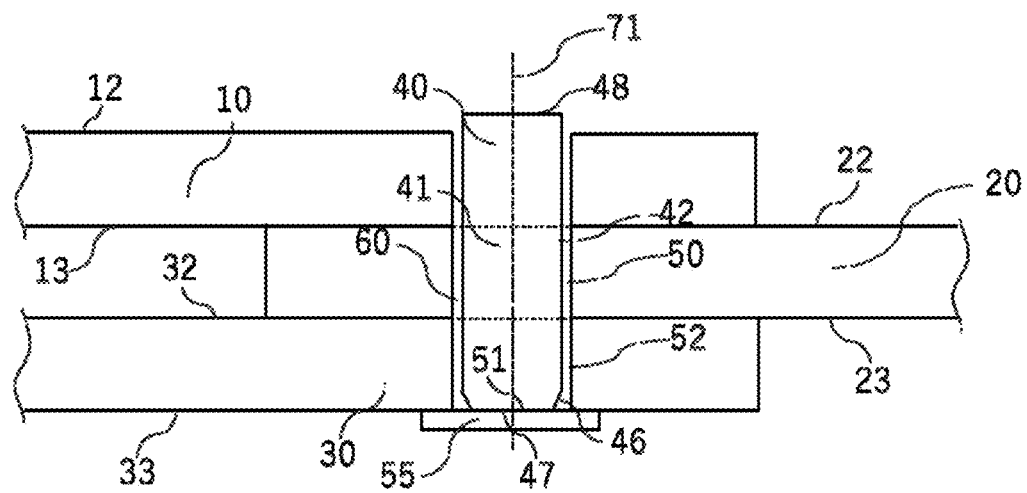
FIG. 8 is a diagram illustrating an application example of Embodiment 3.

When the method of Embodiment 3 is applied, 3 or more steel members can be overlapped and joined as shown in FIG. 8. Namely, the back surface and the front surface of the first steel member 10, the second steel member 20, and the third steel member 30 are respectively overlapped and arranged, and are bonded via the bonding metal 40.

Figure 9:
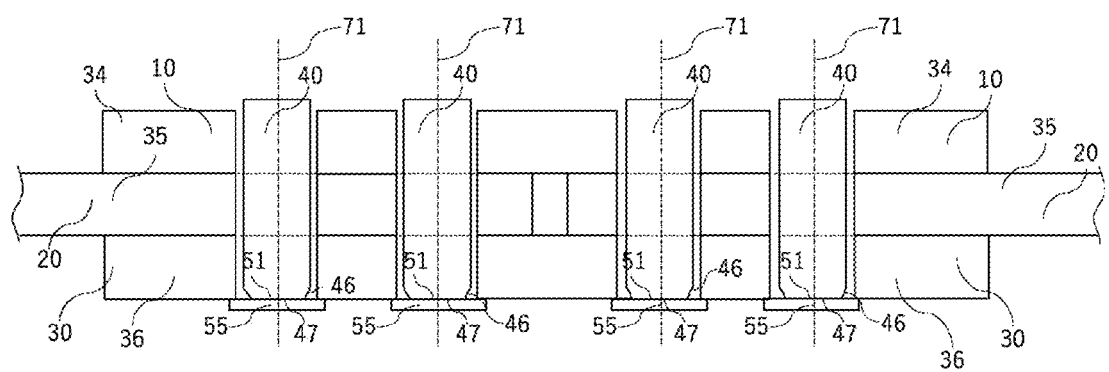
FIG. 9 is a diagram illustrating an application example of Embodiment 3 to a splice plate.

Further, as shown in FIG. 9, the present invention can be applied to a joint of a building steel structure with a splice plate. Here, the first steel member 10, the second steel member 20, and the third steel member 30 are an upper splice plate 34, an H-shaped steel flange plate 35, 35 and a lower splice plate 36, respectively, to be joined through joining metal 40.

Figure 10:
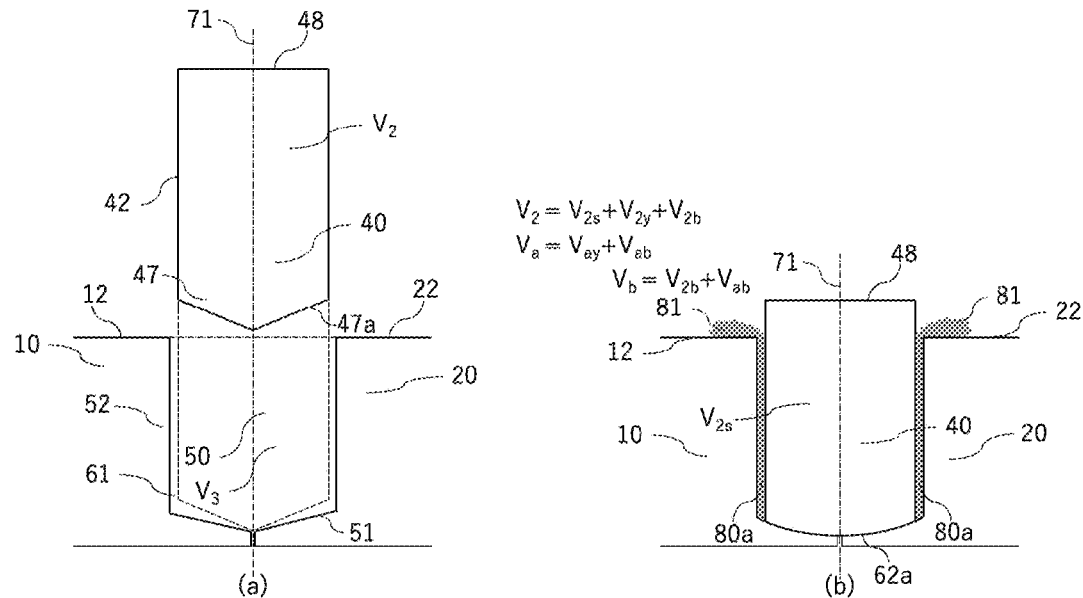
FIG. 10 is a diagram showing a relationship between the volume of a void and the volume of a joining metal; (a) shows a state before joining, and (b) shows a state at the time of joining completion.

By referring to FIG. 10, the invention of claim 9 and the reason for fulfilling the proposition of [0015] will be described in detail based on the phenomenon in the joining process. In the following description, for the sake of simplicity, a change in mass density due to a change in temperature and a change in phase during the joining process is ignored as being small. FIG. 10A shows a state before joining, and FIG. 10B shows a state after joining is completed.

Further, 62a in FIG. 10b shows a rotational friction surface between the tip 47 of the joining metal 40 and the bottom 51 of the cavity 50 when the joining is completed, and the molten metal 80, which is a liquid, is entirely pushed out by pressure, and does not exist inside the rotational friction surface 62a.

The total volume of the joining metal 40 before joining is V2, and the volume of the void 50 is V3.

If the "volume of said bonding metal" according to claim 9 is said to be V2, and at the time of completion of the bonding, the volume remaining as a solid is V2s, the portion of the molten metal 80 derived from the bonding metal 40 that remains in the gap 61 and solidifies is V2y and the volume of the portion of the molten metal 80 derived from the bonding metal 40 that is extruded out of the void and becomes the burr 81 is V2b,
Then the equation below $$V2=V2s+V2y+V2b \quad (1)$$

holds.

Next, the reason that "in the invention of claim 9, the molten metal 80a filled and solidified in the gap completely fills the gap 61 between the side peripheral surface 42 of the joining metal 40 and the side peripheral surface 52 of the void 50" is explained.

When the total volume of the first steel member 10 and the second steel member 20 that melts due to the rotational friction with the joining metal 40 is Va, the volume that becomes a part of the molten metal 80a filled in the gap and solidified is Vay, and further when the volume discharged as the burr 81 is Vab, $$Va=Vay+Vab \quad (2)$$

On the other hand, assuming that the total volume of the burrs 81 to be discharged is Vb, Vb is the sum of V2b derived from the joining metal 40 and Vab derived from the first steel member 10 and the second steel member 20, $$Vb=Vab+V2b \quad (3)$$

When the sum of the volume V3+Va, wherein the volume V3 is the volume of the void 50 and the total volume Va is the volume of the first steel member 10 and the second steel member 20 to be melted by the rotational friction with the joining metal 40, are filled with the volume V2s remaining as a solid originating to the joining metal 40, the volume V2y remaining at a gap 61 in a melted state and the volume Vay remaining at a gap 61 in a melted state originating to the first steel member 10 and the second steel member 20, $$V3+Va \le V2s+V2y+Vay \quad (4)$$

holds.
From (1) and (4), $$V2 \ge V3+Va-Vay+V2b \quad (5)$$

Substituting (2) into (5), $$V2 \ge V3+Vab+V2b \quad (6)$$

Substituting (3) into (6), $$V2 \ge V3+Vb \quad (7)$$

Here, the molten metal 80a filled and solidified in the gap completely fills the gap 61, and the excess molten metal 80 is discharged as burrs 81. Therefore, since the burr 81 exists or is zero, $$Vb \ge 0 \quad (8)$$

holds.
From (7) and (8), $$V2 \ge V3 \quad (9)$$

is established. Equation (9) above expresses the invention of claim 9 by a mathematical expression.

Figure 11:
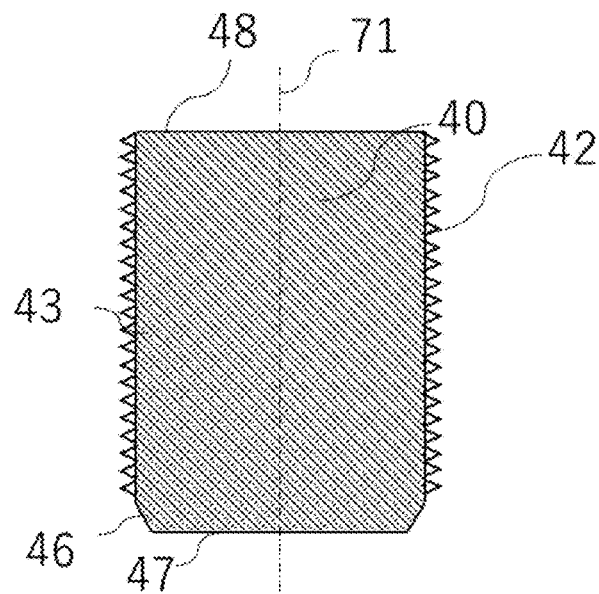
FIG. 11 shows a case wherein the joining metal has unevenness such as a file grove or knurled groove formed on the side peripheral surface.

In Embodiment 1, Embodiment 2, and Embodiment 3, no unevenness is provided on the side peripheral surface 42 of the joining metal 40. However, as shown in FIG. 11, the unevenness 43 may be provided by a file groove or a knurled groove.

Figure 12:
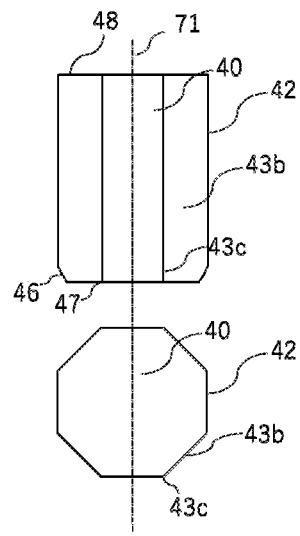
FIG. 12 shows a case wherein the joining metal has unevenness formed by sides and crests of a regular octagon in a sectional view on the peripheral surface.

Further, the unevenness 43 on the side peripheral surface 42 of the joining metal 40 may be sides 43b and ridges 43c of the joining metal 40 in a polygonal cross section as shown in FIG. 12. This processing makes it easier for the generated molten metal 80 to penetrate the cavity 50 in the depth direction.

Figure 13:
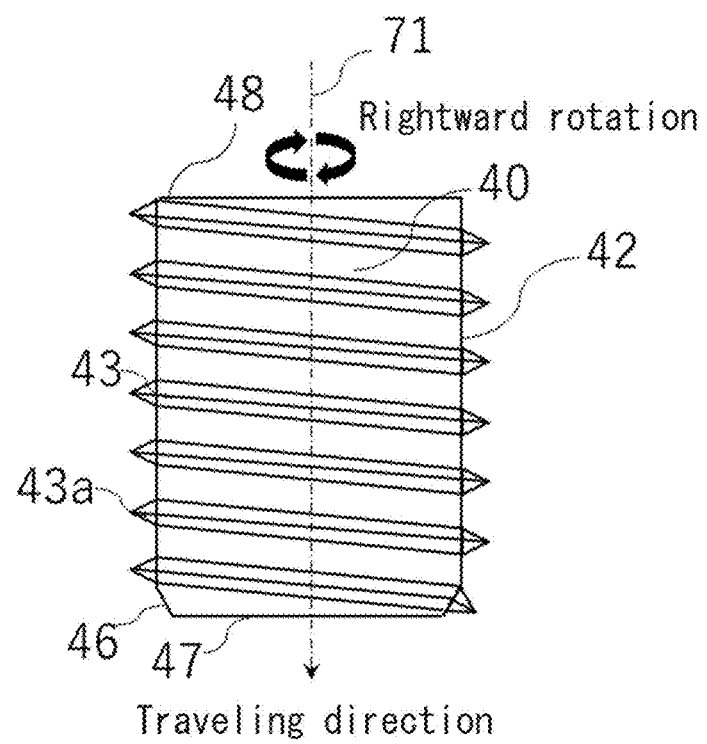
FIG. 13 is a diagram illustrating a case wherein the joining metal has unevenness due to a reverse thread on a side peripheral surface.

Further, as shown in FIG. 13, the unevenness 43 on the side peripheral surface 42 of the joining metal 40 can be a reverse thread 43a for the rightward rotation in the traveling direction from the base end 48 to the tip end 47 of the joining metal 40. By such processing, the molten metal 80 generated is prevented from being discharged from the cavity 50 before being sufficiently filled in the gap 61 between the side peripheral surface 42 of the joining metal 40 and the side peripheral surface 52 of the void 50, promoting the solid filling of the gap 61 with the molten metal 80.

Figure 14:
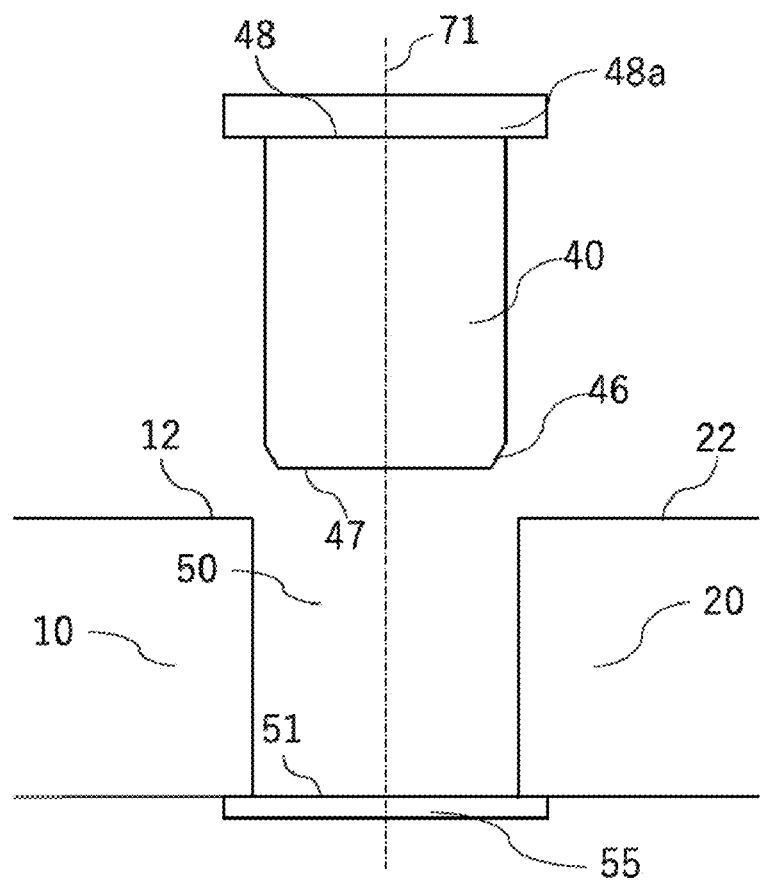
FIG. 14 is a figure explaining a case wherein the joining metal has a flange at the base end of the joining metal to cover the surface side of the void.

As shown in FIG. 14, a flange 48a covering the surface of the void 50 may be provided at the base end 48 of the joining metal 40. It can be expected that the flange 48a can suppress the discharge of burrs, and one can also expect friction welding between the flange 48a and the surfaces 12 and 22 of the steel member.

According to the method of Embodiment 2 or Embodiment 3, a void is generated between the joining units 72 as shown in FIG. 5 and if the strength of the joining metal 40 is less than equivalent to the strength of the first steel member 10 and the second steel member 20, the force equivalent to the total strength of the first steel member 10 and the second steel member 20 cannot be transmitted. In such a case, when the material of the first steel member 10 and the second steel member 20 is, for example, SN400, the force equivalent to the total strength or more can be transmitted by choosing SN490 and such, having higher strength than SN400.

Figure 15:
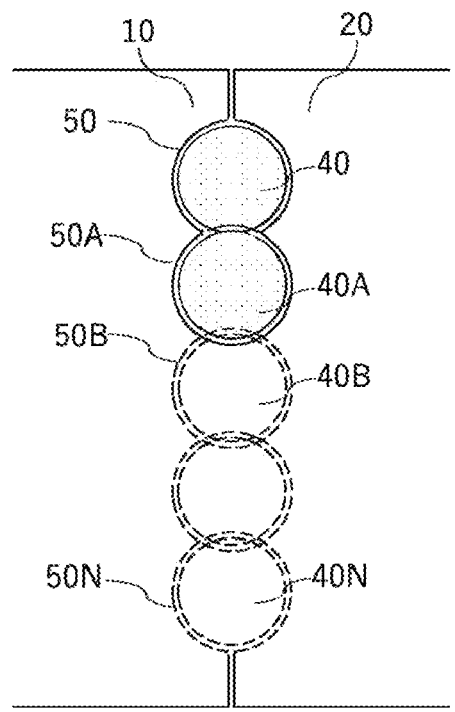
FIG. 15 is a figure illustrating Embodiment 4.

Embodiment 4 of the present invention will be described with reference to FIG. 15. According to the method shown in Embodiment 2, the first steel member 10 and the second steel member 20, each of which is a steel plate SN400 having a thickness of 22 mm, are joined to each other via the joining metal 40, and then the second void 50A similar to the void 50 is formed to be connected to or overlapped on the joining metal 40A, the second joining is completed by fitting and rotating the second join metal 40A similar to the joining metal 40 to the second void 50A. Thereafter, this procedure is repeated N times in order, and the first steel member 10 and the second steel member 20 are joined via the continuous joining metals 40A . . . 40N. By joining the joining metals 40A . . . 40N so as to be continuous or overlapped in this manner, the first steel member 10 and the second steel member 20 can be joined without any gap, and the joining strength can be increased.

When the steel member is cracked and separated into two parts, the steel member can be recovered by re-joining the steel member by applying the method of Embodiment 4.

As the joining metal 40, a metal having a liquidus temperature lower than the liquidus temperature of the first steel member 10 and the liquidus temperature of the second steel member 20 is used. Here, the "liquidus temperature" refers to the melting point of pure metal, and in the case of a multi-component alloy, the solidification start temperature (that is, liquefaction completion temperature) and the liquefaction start temperature (that is, solidification completion temperature) are different. Therefore, the solidification starting temperature is not called the melting point, but is called the liquidus temperature. As a metal having a low liquidus temperature as the bonding metal 40, a high-strength Al alloy (A2017, 2024, 7075, etc.) can be used.

Figure 16:
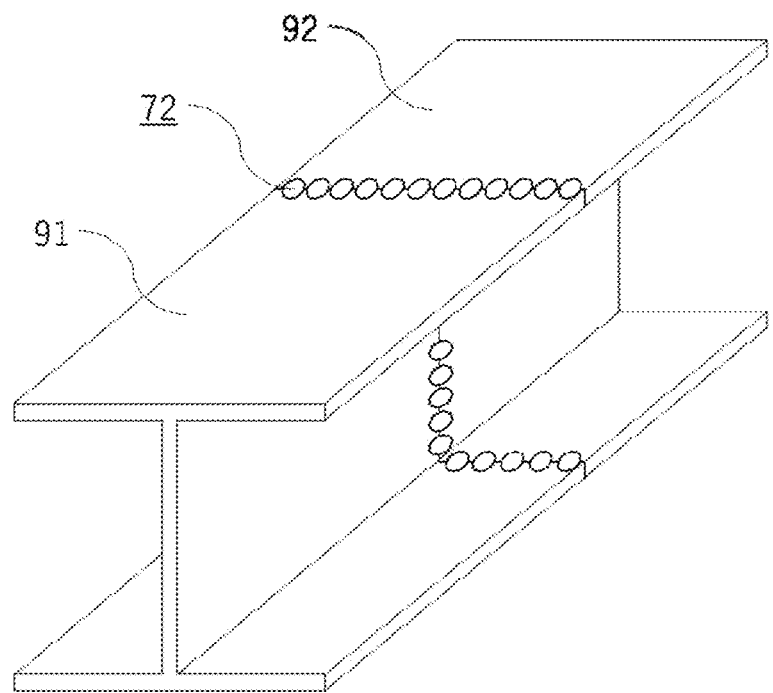
FIG. 16 is a figure illustrating Embodiment 5.
Figure 17:
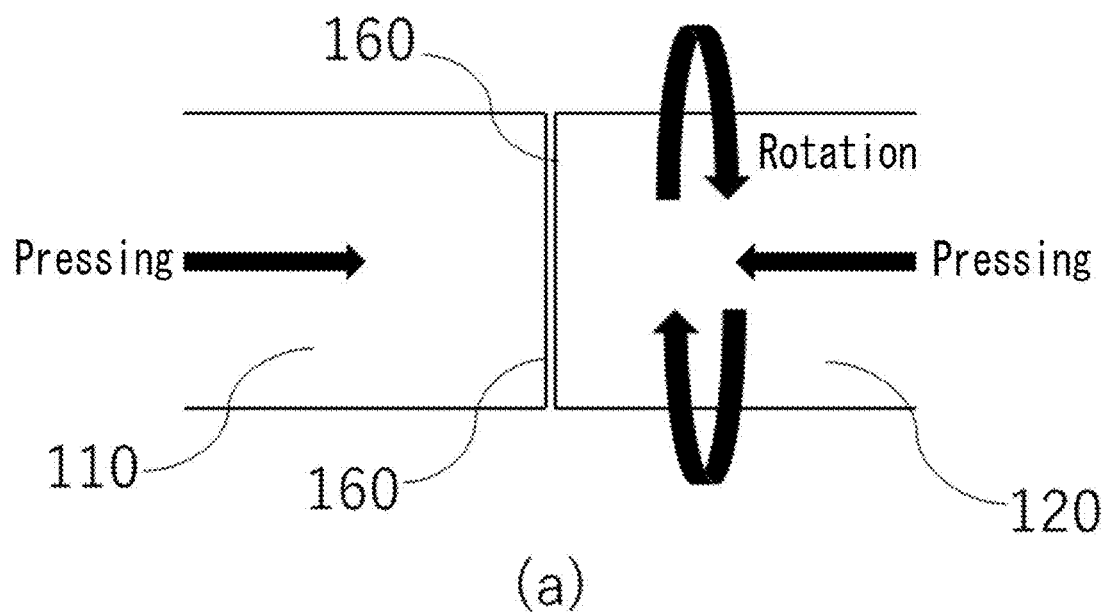
FIG. 17 is a diagram illustrating a conventional technique.
Figure 17:
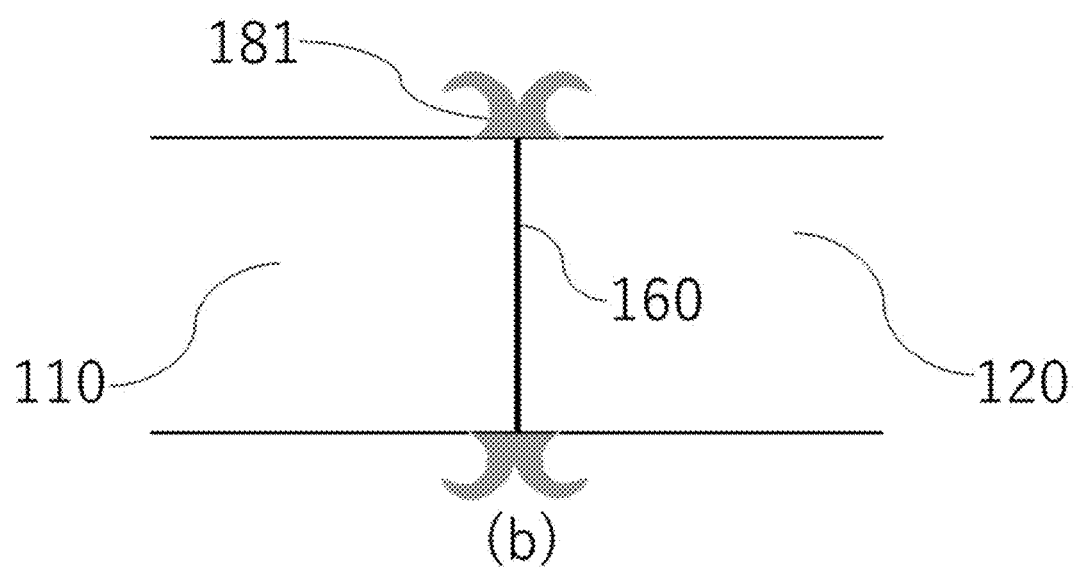
Figure 18:
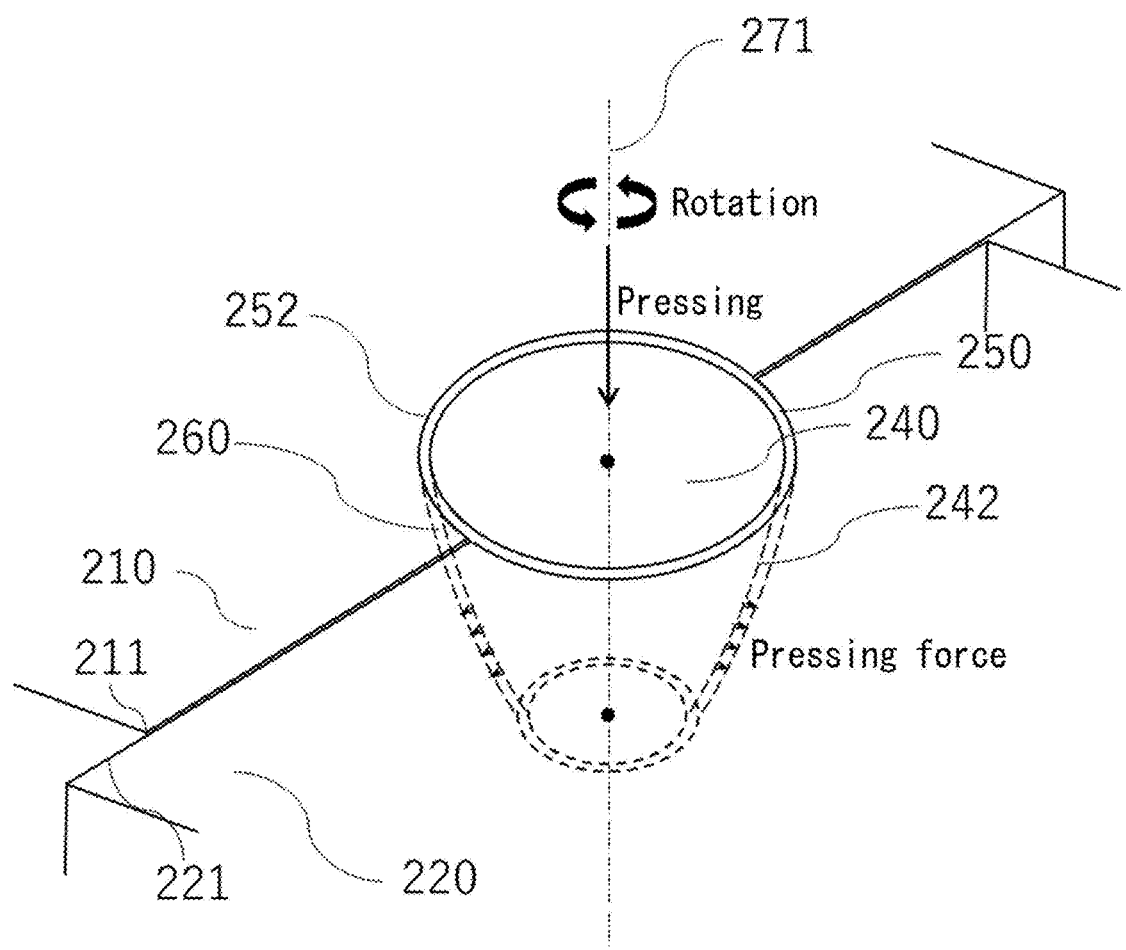
FIG. 18 is a diagram explaining the technology of a previous application by the applicants of the present invention.

Embodiment 5 of the present invention, as shown in FIG. 16, describes an application to H-section steels 91 and 92 which are frequently used in a joint structure of a building steel structure. Namely, the end surfaces of the flange plates and the web plates of the H-shaped steel members 91 and 92 are abutted on each other, and the joining units 72 of the present invention are arranged in parallel, whereby the H-shaped steel members 91 and 92 can be bonded to each other. The joining method of the present invention can be applied to a steel member having a closed section such as a square steel pipe or a circular steel pipe.

INDUSTRIAL APPLICABILITY

A new joining method and a joining structure have been presented that can replace or be used in conjunction with welding or high-strength bolted friction joints for joining steel members that make up a steel structural skeleton, such as columns and beams of building steel structures.

DESCRIPTION OF SYMBOLS

10: First steel member (steel member to be joined)
11: End surface of first steel member
12: Surface of first steel member
13: Back surface of first steel member
20: Second steel member (steel member to be joined)
21: End surface of second steel member
22: Surface of second steel member
23: Back surface of second steel member
30: Third steel member (steel member to be joined)
32: Surface of third steel member
33: Back surface of third steel member
34: Upper splice plate
35: Flange plate
36: Lower splice plate
40: Joining metal
41: Joining metal main body
42: Side peripheral surface of joining metal
43: Unevenness on side peripheral surface of joining metal
43a: Left-hand screw on side peripheral surface of joining metal
43b: Sides on side peripheral surface of joining metal in a polygonal cross section
43c: Ridges on side peripheral surface of joining metal in a polygonal cross section
46: Tip taper portion of joining metal
47: Tip end portion of joining metal
47a: tip end surface of joining metal
48: Base end of joining metal
48a: flange provided at base end of joint metal
50: Void
50a: Semi-cylindrical void provided in first steel member
50b: Semi-cylindrical void provided in second steel member
50c: Cylindrical void provided in first steel member
50d: Cylindrical void provided in second steel member
51: Bottom of void
51a: Bottom of void provided in first steel member
51b: Bottom of void provided in second steel member
52: Side peripheral surface
55: Backing plate
60: Contact portion formed between tip end portion of the joining metal and bottom portion
61: Gap between side peripheral surface of joining metal and side peripheral surface of void
62: Rotational friction surface formed between tip end portion of the joining metal and bottom portion
62a: Rotational friction surface between tip end portion of joining metal and bottom portion of void at completion of joining
70: Rotating device
71: Rotation axis of rotationally symmetric body
72: Joining unit
80: Molten metal
80a: Molten metal filled into and solidified in gap
81: Burr formed by re-solidification of molten metal extruded outside the void
91: First H-shaped steel member
92: Second H-shaped steel member
110: First steel member in prior art
120: Second steel member in prior art
160: Contact portion in prior art
181: Burr in prior art
210: First steel member in prior application 211: End surface of first steel member in prior application
220: Second steel member in prior application
221: End surface of second steel member in prior application
240: Joining metal in prior application
242: Side peripheral surface of joining metal in prior application
250: Void in prior application
252: Side peripheral surface of void in prior application
260: Contact surface between side peripheral surface of joint metal and side peripheral surface of void in prior application

What is claimed is:

1. A joining method for joining a first steel member and a second steel member through a joining metal, said method based on rotational friction, said method comprising:
    positioning said first steel member and said second steel member at neighboring positions with an end surface of said first steel member and an end surface of said second steel member opposing each other;
    manufacturing a void which straddles the end surface of said first steel member and the end surface of said second steel member, said void having a rotational axis, said void also having a side peripheral surface and having a bottom and a rotationally symmetrical shape;
    inserting the joining metal into said void, said joining metal having a rotationally symmetrical body and a peripheral surface;
    generating friction by rotating said joining metal around said rotational axis with a contact portion between a tip of said joining metal and said bottom of said void under a pressing force;
    generating molten metal near said contact portion by utilizing frictional heat from said friction, said molten metal comprising at least melted joining metal;
    filling said molten metal into a gap between said peripheral surface of said joining metal and said peripheral surface of said void by utilizing said pressing force and rotational motion generated at the tip of said joining metal; and
    subsequently stopping said rotational motion, thus allowing said molten metal to become solidified and be integrated with the steel members near said gap, thus joining said first steel member and said second steel member.

2. The method of claim 1, wherein said bottom of said void is formed as a bottomed void inside the first steel member or the second steel member or both.

3. The method of claim 1, wherein said bottom of said void is formed at least in part by attaching a backplate at a back surface of at least one steel member to partially shut said void.

4. The method of claim 1, wherein the method completes a first joining by inserting and rotating said joining metal into said void, and wherein the method further comprises joining said first steel member and said second steel member by performing the following procedure one or more times:
    forming an additional void which continues or overlaps a prior void location; and
    completing an additional joining by inserting and rotating an additional joining metal into said additional void.

5. The method of claim 1, comprising:
    positioning the end surface of said first steel member and the end surface of said second steel member in opposition to each other; and
    manufacturing the void straddling the end surface of said first steel member and the end surface of said second steel member, said void manufactured such that said rotational axis of said void is inside said end surface, and is directed to a thickness direction of a steel member cross section, which is a short side direction of said end surface.

6. The method of claim 1, comprising:
    positioning the end surface of said first steel member and the end surface of said second steel member in opposition to each other; and
    manufacturing the void straddling the end surface of said first steel member and the end surface of said second steel member, said void manufactured such that said rotational axis of said void is inside said end surface, and is directed to a width direction of a steel member cross section, which is a long side direction of said end surface.

7. The method of claim 1, wherein said void has a cylindrical shape and said joining metal has a roughly cylindrical body.

8. The method of claim 1, wherein said joining metal has a volume that is not smaller than a volume of said void prior to said stopping.

9. The method of claim 1, wherein said joining metal has a taper portion at the end portion of said joining metal.

10. The method of claim 1, wherein said side peripheral surface of said joining metal has unevenness prior to said stopping.

11. The method of claim 10, wherein said unevenness on said side peripheral surface of said joining metal includes an edge and a side of a cross sectional polygon of said joining metal.

12. The method of claim 10, wherein said unevenness on said side peripheral surface of said joining metal includes a cross direction screw running toward a tip end from a base end of said joining metal.

13. The method of claim 1, wherein an end portion of said joining metal has a flange covering a surface side of said void.

14. The method of claim 1, wherein a joining metal rotation number is 1000 to 12000 rpm at and after a time of insertion of said joining metal into said void.

15. The method of claim 1, wherein a tensile strength of said joining metal is higher than both a tensile strength of material of said first steel member and a tensile strength of material of said second steel member.

16. The method of claim 1, wherein a liquidus temperature of said joining metal is lower than either of a liquidus temperature of material of said first steel member and a liquidus temperature of material of said second steel member.

17. The method of claim 16, wherein a high strength Al alloy is employed as a metal of low liquidus temperature for said joining metal.

18. A joining method for joining a first steel member and a second steel member through a joining metal, said method based on rotational friction, said method comprising:
    positioning said first steel member and said second steel member at neighboring positions with a back surface of said first steel member and a front surface of said second steel member opposing each other;
    manufacturing a void which has a side peripheral surface and a bottom and a rotationally symmetrical shape in line with a straight line running through a back surface of said first steel member and a front surface of said second steel member, said void having a rotational axis;
    inserting the joining metal into said void, said joining metal having a rotationally symmetrical body and a peripheral surface;

generating friction by rotating said joining metal around said rotational axis with a contact portion between a tip of said joining metal and said bottom of said void under a pressing force;

generating molten metal near said contact portion by utilizing frictional heat from said friction, said molten metal comprising at least melted joining metal;

filling said molten metal into a gap between said peripheral surface of said joining metal and said peripheral surface of said void by utilizing said pressing force and rotational motion generated at the tip of said joining metal; and subsequently stopping said rotational motion, thus allowing said molten metal to become solidified and be integrated with the steel members near said gap, thus joining said first steel member and said second steel member.

19. A joint structure of steel members joined by rotational friction, wherein said steel members are joined by a method comprising the following:

positioning a first steel member and a second steel member at neighboring positions with a surface of said first steel member and a surface of said second steel member opposing each other;

manufacturing a void which has a side peripheral surface and a bottom and a rotationally symmetrical shape, said void having a rotational axis;

inserting the joining metal into said void, said joining metal having a rotationally symmetrical body;

generating friction by rotating said joining metal around said rotational axis with a contact portion between a tip of said joining metal and said bottom of said void under a pressing force;

generating molten metal near said contact portion by utilizing frictional heat from said friction;

filling said molten metal into a gap between said peripheral surface of said joining metal and said peripheral surface of said void by utilizing said pressing force and rotational motion generated at the tip of said joining metal; and subsequently stopping said rotational motion, thus allowing said molten metal to become solidified and joining said first steel member with said second steel member.

20. The joint structure of claim 19, wherein a tensile strength of said joining metal is higher than both a tensile strength of material of said first steel member and a tensile strength of material of said second steel member.

* * * * *